United States Patent
Hammer

(10) Patent No.: US 7,137,560 B2
(45) Date of Patent: Nov. 21, 2006

(54) OPTICAL SCANNER

(75) Inventor: Steven J. Hammer, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/000,022

(22) Filed: Nov. 30, 2004

(65) Prior Publication Data

US 2006/0113394 A1    Jun. 1, 2006

(51) Int. Cl.
*G06K 7/10* (2006.01)
*G02B 26/08* (2006.01)

(52) U.S. Cl. .................. 235/462.39; 359/216
(58) Field of Classification Search ..............
235/462.01–462.49, 454; 356/622; 359/216–221
See application file for complete search history.

(56) References Cited

U.S. PATENT DOCUMENTS

| | | | |
|---|---|---|---|
| 4,300,160 A * | 11/1981 | Pusch et al. ................. 348/167 |
| 4,973,838 A * | 11/1990 | Bell et al. ................... 250/234 |
| 5,252,816 A * | 10/1993 | Onimaru et al. ........ 235/462.36 |
| 5,493,388 A | 2/1996 | Adachi et al. |
| 5,555,125 A * | 9/1996 | Peng .......................... 359/203 |
| 5,648,852 A * | 7/1997 | Kato et al. .................. 356/622 |
| 5,663,550 A * | 9/1997 | Peng .................... 235/462.39 |
| 5,742,420 A * | 4/1998 | Peng .......................... 359/201 |
| 5,767,501 A * | 6/1998 | Schmidt et al. ........ 235/462.45 |
| 5,886,336 A | 3/1999 | Tang et al. |
| 2004/0056099 A1 | 3/2004 | Barkan |
| 2004/0217175 A1 | 11/2004 | Bobba et al. |

FOREIGN PATENT DOCUMENTS

EP    0671698 A    9/1995

* cited by examiner

*Primary Examiner*—Jared J. Fureman
*Assistant Examiner*—Jamara A. Franklin
(74) *Attorney, Agent, or Firm*—Priest & Goldstein, PLLC

(57) ABSTRACT

An optical scanner includes a scanner housing including a scan window, a laser light source, reflected light detector and a mirrored polygon spinner. The spinner is arranged to spin around both a first axis of rotation and a second axis of rotation so as to produce a substantially hemispherical scan volume.

42 Claims, 10 Drawing Sheets

HEMISPHERICAL SHAPED SCAN VOLUME

WEDGE SHAPED SCAN VOLUME

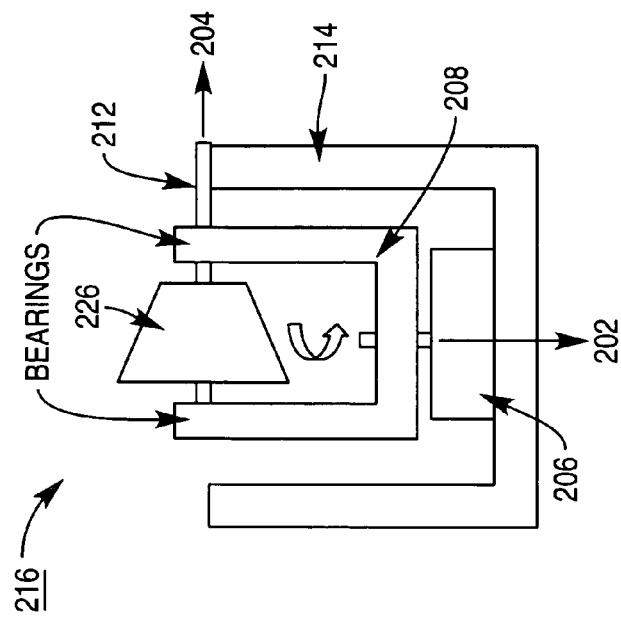
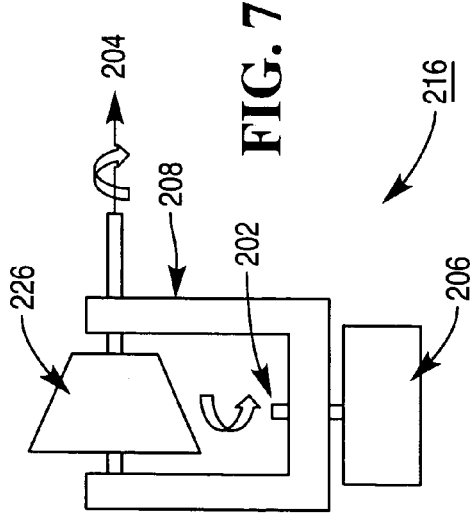
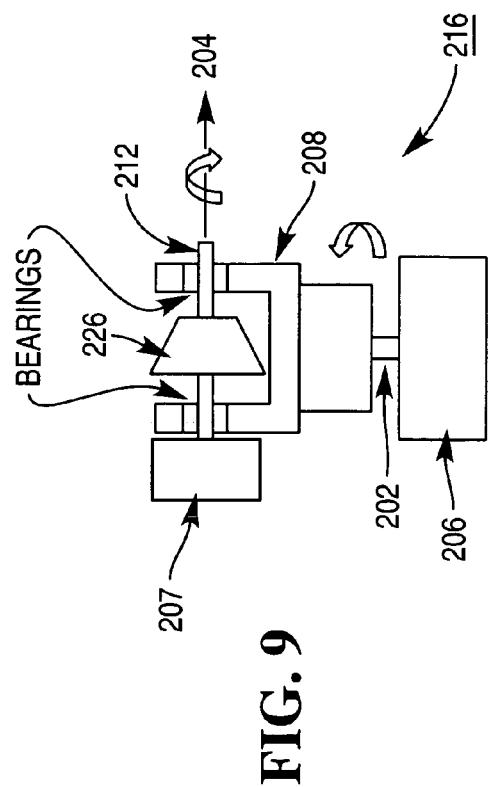

OPTICAL SCANNER

The present invention relates to an optical scanner and more specifically to an optical scanner having enhanced scan volume.

BACKGROUND OF THE INVENTION

Problems of enhanced scan volume and increased readability of barcodes held at different orientations to a scanner are common to all barcode scanners (single and dual aperture scanners). Although these problems have been best addressed by the use of dual aperture scanners, even these scanners produce scan patterns with gaps in item coverage. These gaps generally increase as the item is moved away from an ideal position in the center of the scan volume.

Commonly assigned U.S. Pat. Nos. 5,229,588, 5,684,289, and 5,886,336 disclose a typical dual aperture optical scanner. The scanning light beams from a laser diode pass through substantially horizontal and vertical apertures to provide more item coverage than a single aperture scanner.

Furthermore, in an effort to increase item coverage, optics designers are increasing the number of scan lines, line length, and scan angles by increasing the number of lasers and pattern mirrors in the scanner. The addition of these components consequently increases cost.

Therefore, it would be desirable to provide an optical scanner which is not only capable of reading a bar code label on any one of six orthogonal surfaces of an item oriented at right angles to the scanner, but is also capable of reading the bar code label if it is located on any intermediate surfaces between those orthogonal surfaces.

The complexity of dual aperture scanners will be described in order to illustrate another advantage of the present invention, which is the simplicity and corresponding ease of construction of the scanner.

As will be illustrated in more detail below, with reference to FIGS. 1 to 6, present day scanners comprise, a laser assembly, spinner assembly, collection optics, pattern mirrors, detector assembly, electronics, a window and scanner housing which contains all the individual assemblies. In operation, the laser beam intercepts the polygon spinner rotating about a single axis and is subsequently scanned in a single plane towards a set of pattern mirrors which reflect the individual scan lines out the window and onto a barcode. The laser energy is then reflected off of the barcode and a portion is gathered by the collection optics and focused onto the detector generating a signal to be decoded by the electronics. The positions at which the scan lines exit the window are static, and are contained in a relatively small portion of the hemispherical volume available outside and adjacent to the window (FIG. 6). Consequently, the readability of barcodes is limited to certain orientations within that small scan volume

SUMMARY OF THE INVENTION

It would be desirable to provide an optical scanner with a reduction in coverage gaps and an improvement in omnidirectional item coverage. It would also be desirable to provide a scan engine which can be utilized in an optically simpler barcode scanner (regardless of the number of scanner apertures) for improved manufacturability and reduced cost.

In accordance with a first aspect of the present invention there is provided an optical scanner comprising a scanner housing including a scan window, a laser light source, a reflected light detector and a mirrored polygon spinner which is arranged to spin around both a first axis of rotation and a second axis of rotation.

Preferably, the first and second axes of rotation are substantially orthogonal and the first axis of rotation is pointed to the scan window. In one embodiment it may be substantially parallel to the scan window.

Most preferably the polygon spinner is externally mirrored.

In one embodiment the scanner further comprises pattern mirrors arranged to direct light from the polygon spinner through the scan window so as to produce scan lines.

Preferably, the spinner is mounted on a rotating gimbal which is in turn rotated by a motor.

Alternatively, the spinner is rotated through the application of magnetic force, compressed air, by the motor via a slip ring or the spinner is mounted on a shaft which is rotated by friction gears or other suitable means on a stationary cylinder surrounding the motor and spinner.

Preferably the scanner further comprises an arrangement of pattern mirrors, or basket of mirrors, arranged to direct light from the polygon spinner through the scan window so as to produce scan lines.

Most preferably, the externally mirrored polygon spinner is arranged to spin in said first axis of rotation and is located substantially within said pattern mirrors, which are arranged to spin in said second axis or rotation.

Preferably, the optical scanner further comprises control circuitry in the scanner housing for obtaining bar code information from electrical signals from the reflected light detector.

In accordance with a second aspect of the present invention there is provided an optical scanner comprising a scanner housing including a scan window, a laser light source, reflected light detector and a mirrored polygon spinner arranged to spin around both a first axis of rotation and a second axis of rotation, the scanner further comprising an arrangement of pattern mirrors arranged to direct light from the polygon spinner through the scan window so as to produce scan lines, wherein the externally mirrored polygon spinner is arranged to spin in said first axis of rotation and is located substantially within said arrangement of pattern mirrors.

In one embodiment the arrangement of pattern mirrors comprise a pair of mirrors which are arranged to spin in said second axis of rotation. In another embodiment the arrangement of pattern mirrors comprise an internally mirrored polygon or basket of mirrors.

According to a third aspect of the present invention there is provided a mirrored polygon spinner assembly, for use with an optical scanner, the assembly comprising a spinner and a means of rotating the spinner, the spinner being arranged to spin around both a first axis of rotation and a second axis of rotation.

According to a fourth aspect of the present invention there is provided a method of scanning a bar code utilizing an optical scanner comprising a scanner housing including a scan window, a laser light source, reflected light detector and a mirrored polygon spinner arranged to spin around both a first axis of rotation and a second axis of rotation, so as to produce a scan volume outside of the scan window, the method comprising positioning the bar code within the scan volume at any orientation to the scan window.

Preferably the scan volume produced is substantially hemispherical. Alternatively the scan volume produced is substantially cone shaped.

In accordance with a fifth aspect of the present invention, there is provided an optical barcode scanner comprised of a scanner housing assembly, window assembly, laser light source, collection optics, detector assembly, decoding electronics, and a dual axis scan engine. The scan engine is comprised of a mirrored polygon spinner arranged to spin around both the spinner axis of rotation and the gimbal axis of rotation. The spinner and gimbal axes of rotation are preferably orthogonal with the gimbal axis pointed towards the collection optics and exit window. The polygon spinner is mounted in a gimbal assembly which may include a yoke, motor(s), bearings, axle, and spinner. The gimbal assembly is rotated about the gimbal axis, preferably by a motor. The polygon spinner is also rotated about its spinner axis by contact methods such as one or more electric motors or friction/gears, or by non-contact methods such as electromagnetic fields permanent magnetic fields or gas/air pressure.

In the preferred embodiment of the dual axis scan engine, the polygon spinner reflects the laser light directly out the scanner window aperture. In this embodiment, pattern mirrors are not required.

In an alternative embodiment of the dual axis scan engine, the spinner reflects a portion of the laser light directly out of the scanner window aperture, and the remaining portion of the laser light is reflected off of pattern mirrors prior to being directed out the scanner window aperture. The pattern mirrors may be stationary, or they may be mounted such that they rotate about the second axis.

Scan engines in accordance with the present invention can not only be utilized in new optical bar code scanners, they can be retrofitted to existing scanners, as described with reference to FIGS. 1 to 6, in place of prior art scan engines. In addition scan engines in accordance with the present invention can be made small enough and in such a way that they can be a common module scan engine for any, or at least most, bar code scanners.

BRIEF DESCRIPTION OF THE DRAWINGS

An embodiment of a prior art dual aperture scanner will now be described, by way of example, with reference to the accompanying drawings, in which.

Figure 12:
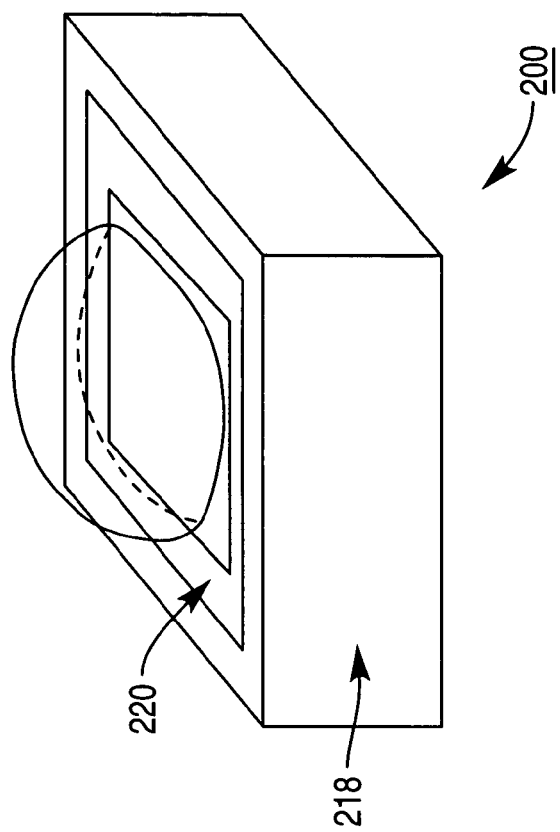
Figure 6:
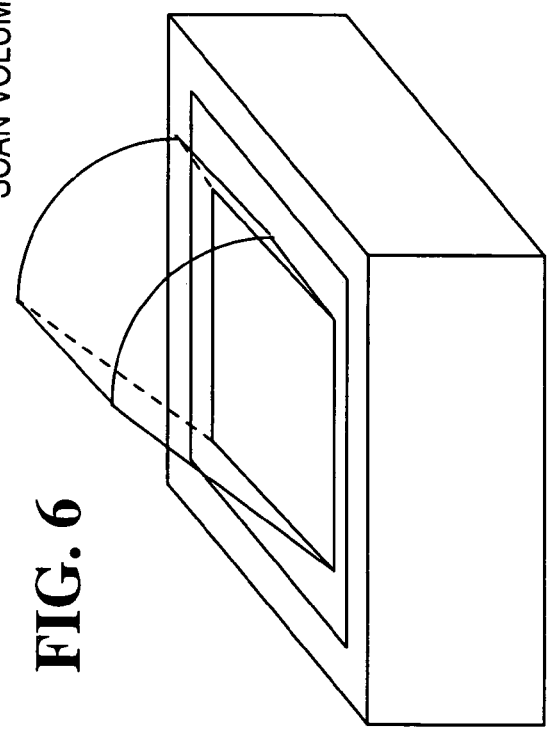
FIG. 6 is a schematic illustration of the scan volume from the horizontal window of the scanner of FIG. 1, utilizing a prior art scan engine.
Figure 10:
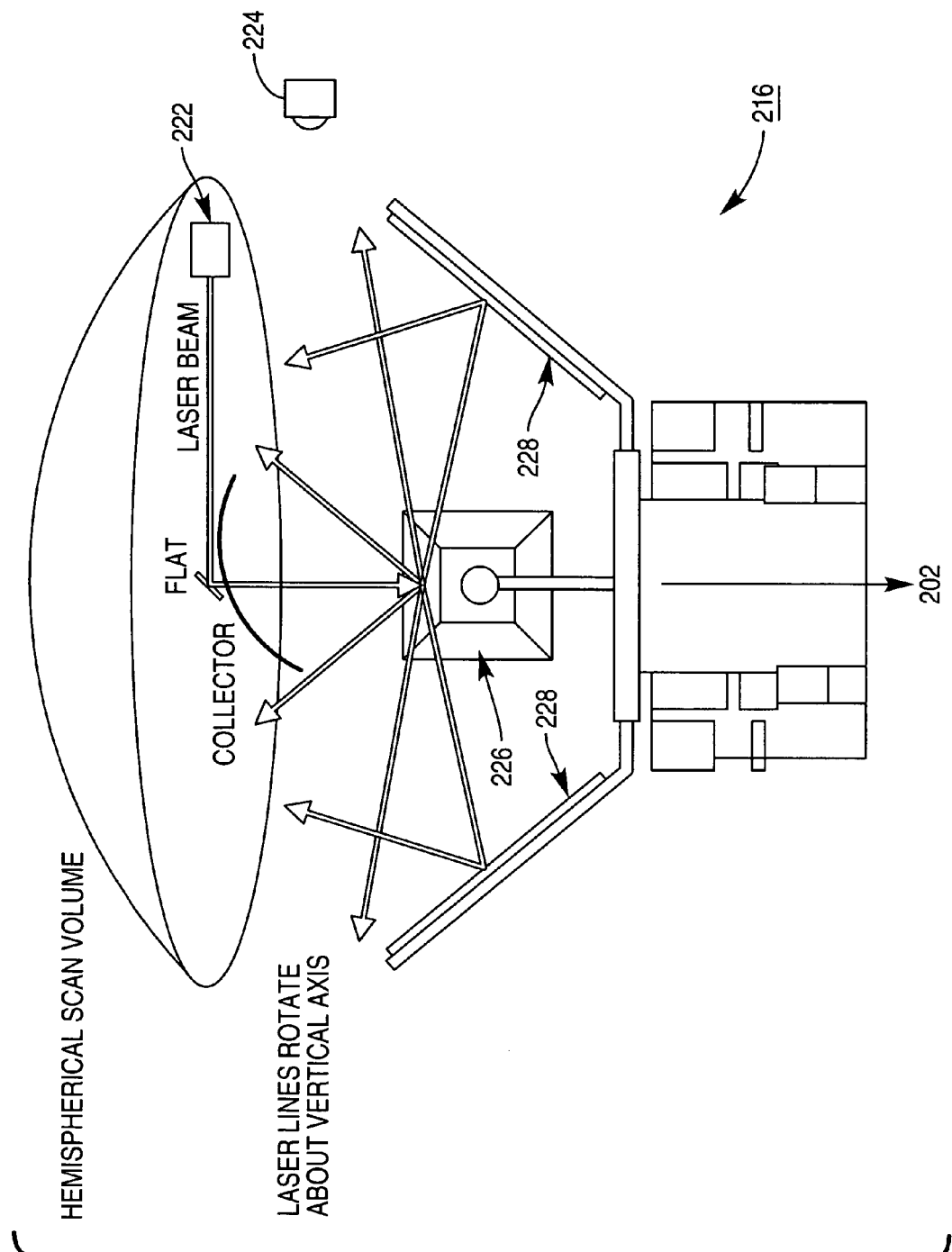
Figure 11:
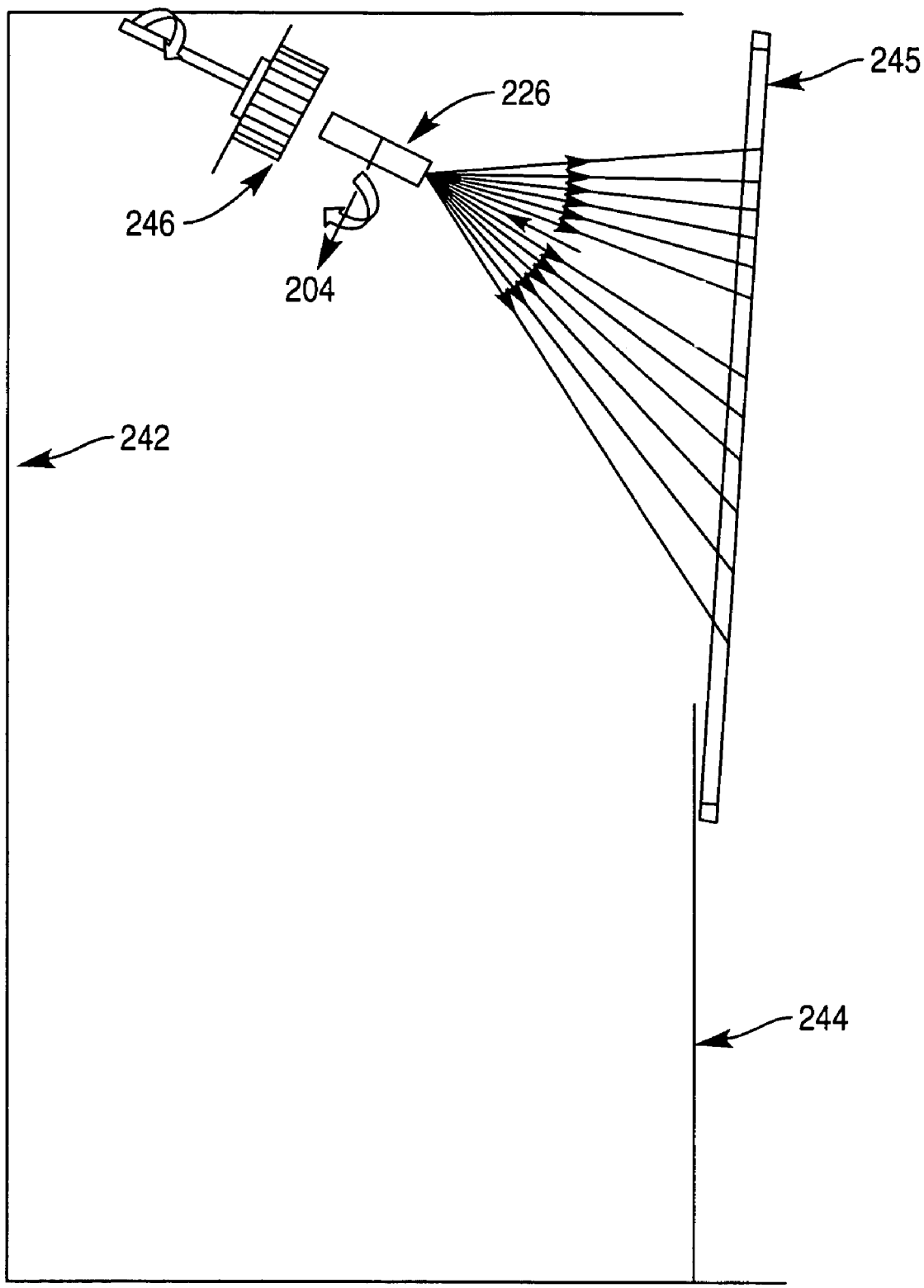
Figure 13:
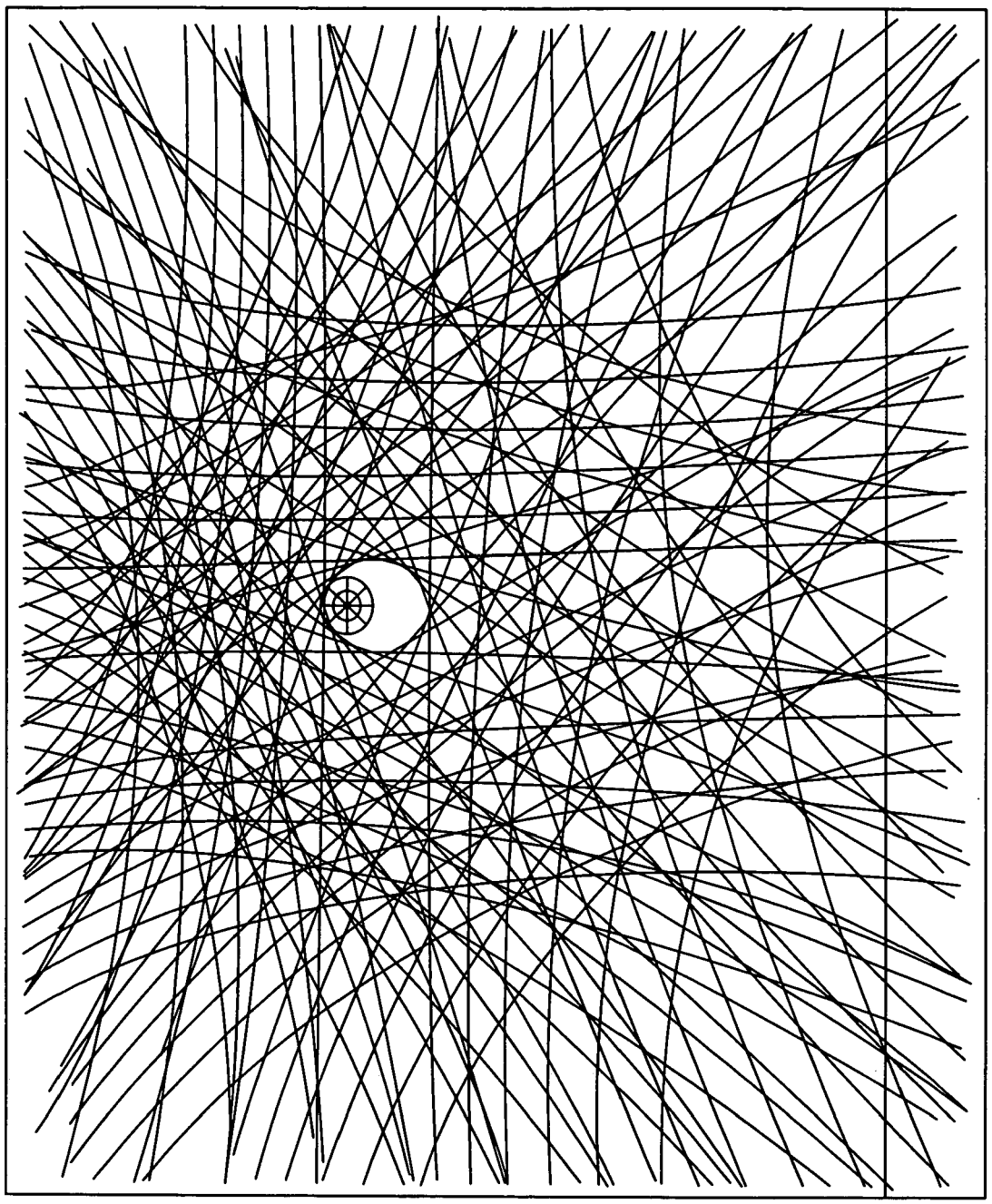

However, it should be noted that the arrangement of pattern mirrors described with reference to the aforementioned drawings can be utilized in a scanner in accordance with the present invention as long as the scanner also utilizes a spinner in accordance with one aspect of the present invention. Thereafter embodiments of the present invention will be described, by way of example, with reference to the accompanying drawings, in which:

FIG. 7 is schematic of a spinner for use in an optical scanner in accordance with the present invention, arranged to spin around two different axis of rotation;

FIG. 8 is a schematic representation of a first embodiment of the present invention illustrating one way in which the spinner of FIG. 7 can be powered to spin about said two different axis of rotation;

FIG. 9 is a schematic representation of a second embodiment of the present invention illustrating another way in which the spinner of FIG. 7 can be powered to spin about said two different axis of rotation;

FIG. 10 is a schematic representation of a spinner in accordance with another embodiment of the present invention;

FIG. 11 is a schematic representation of a preferred embodiment of a scanner in accordance with the present invention;

FIG. 12 is a schematic representation of the substantially hemispherical scan volume produced by an embodiment of the present invention; and FIG. 13 is a representation of the scan pattern produced by a scan engine in accordance with the present invention.

DETAILED DESCRIPTION

Figure 1:
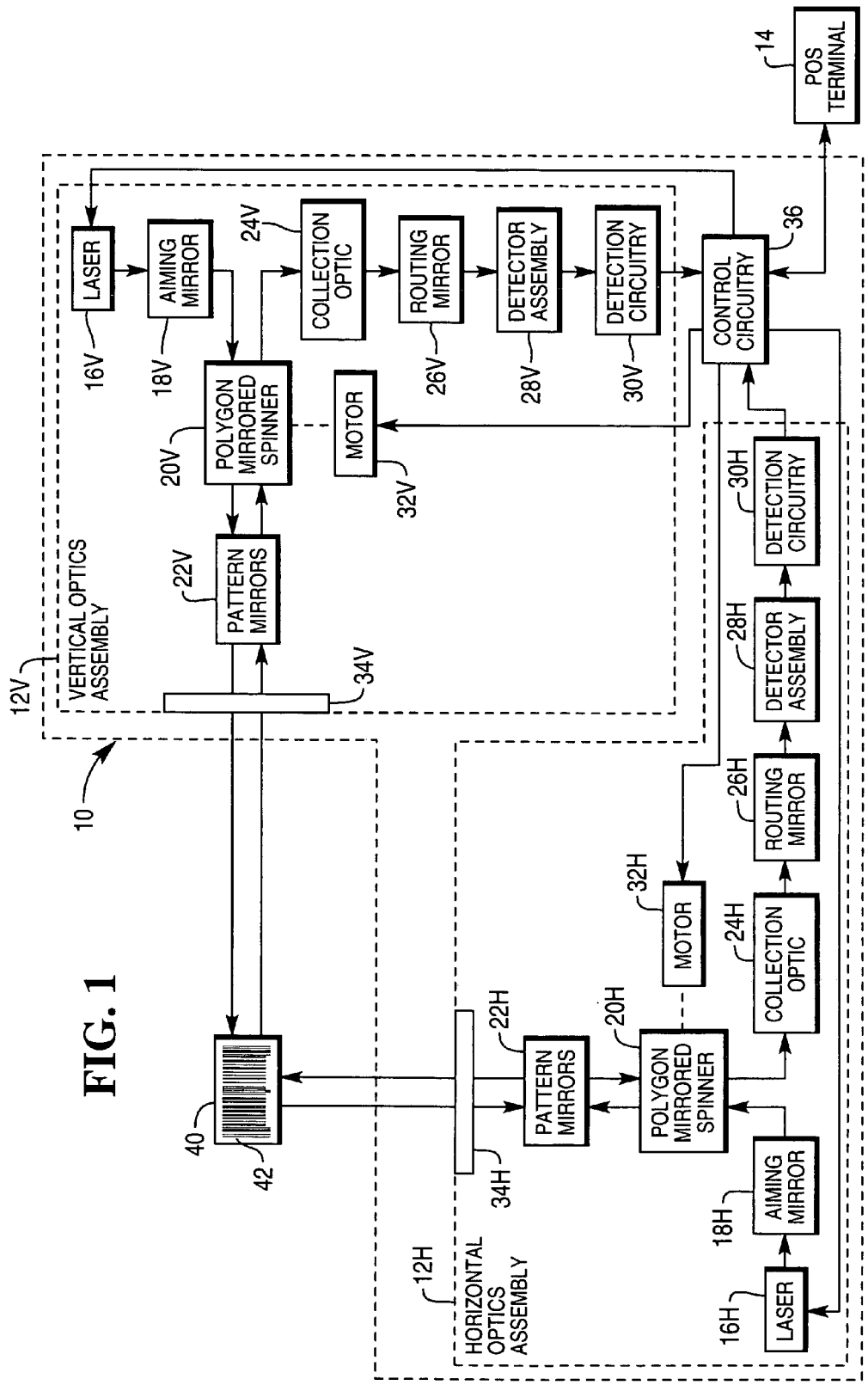
FIG. 1 is a block diagram of a dual aperture optical scanner.

Referring now to FIG. 1, prior art dual aperture optical scanner 10 includes horizontal optics assembly 12H and vertical optics assembly 12V, and control circuitry 36 for controlling horizontal and vertical optics assemblies 12H and 12V. If one of optics assemblies 12H and 12V fails, scanner 10 retains partial operation.

Horizontal optics assembly 12H projects a scan pattern through substantially horizontal aperture 34H to scan bar codes 42 located on bottom, leading, trailing and checker side surfaces of item 40. It will also scan bar codes 42 on intermediate surfaces including those between the bottom and customer side surfaces.

Horizontal optics assembly 12H includes laser 16H, aiming mirror 18H, polygon mirrored spinner 20H, pattern mirrors 22H, routing mirror 26H, collection optic 24H, detector assembly 28H, detection circuitry 30H, and motor 32H.

Laser 16H includes one or more laser diodes or other suitable laser sources. Laser 16H may include a laser having a wavelength of 650 nm.

Figure 4:
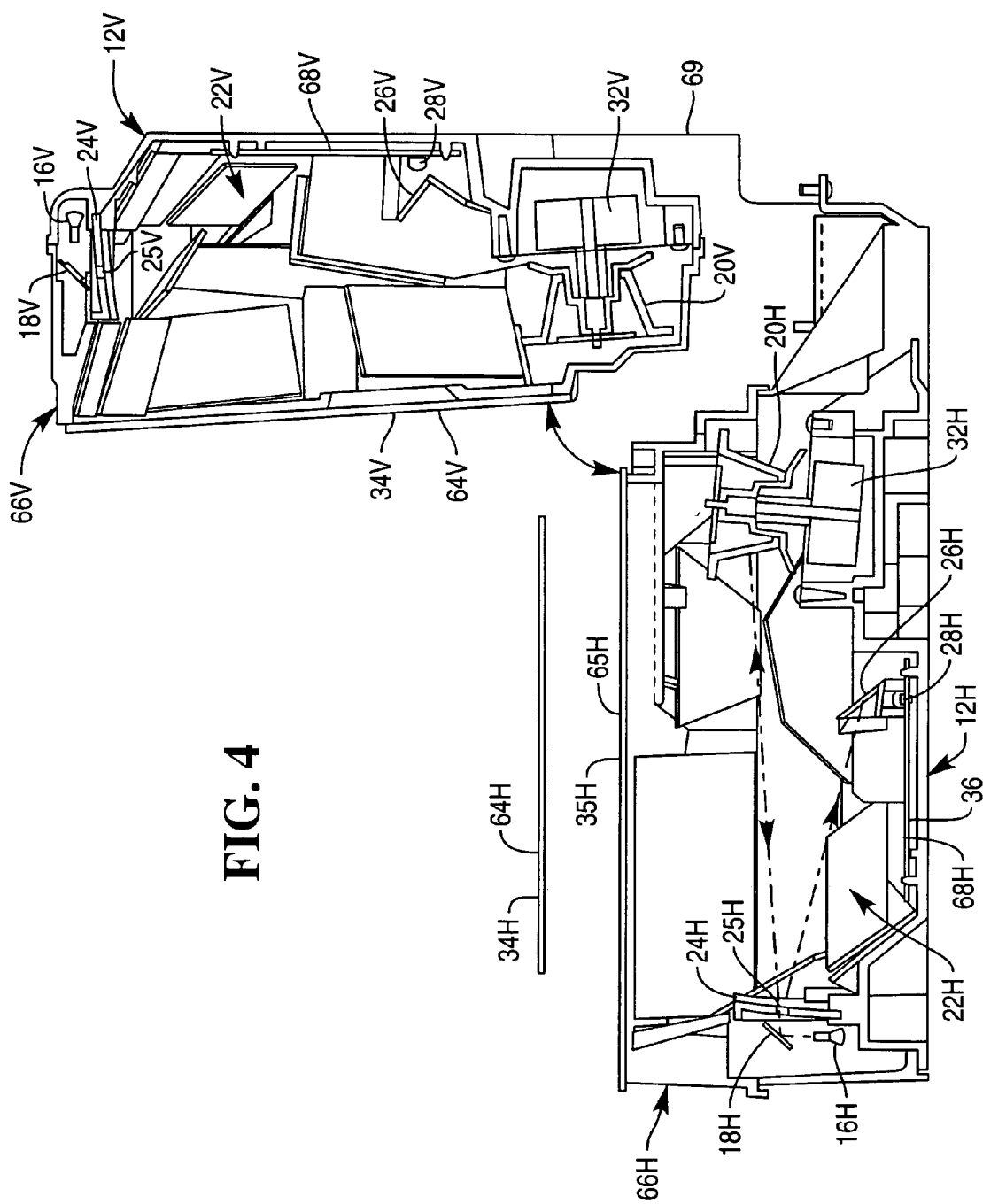
FIG. 4 is a sectional view of the scanner of FIG. 1, along lines 4—4 of FIG. 3.

Aiming mirror 18H aims a laser beam from laser 16H to polygon mirrored spinner 20H. The laser beam passes through a hole 25H in collection optic 24H (FIG. 4).

Polygon mirrored spinner 20H directs the laser beam to pattern mirrors 22H. Polygon mirrored spinner 20H also routes collected light to collection optic 24H. Polygon mirrored spinner 20H preferably includes four facets, but may include other numbers of facets. Facets are grouped into two pairs. Two opposite facets have angles of 74 degrees and 76 degrees from the spinner base. The other pair of opposite facets have angles of 86.5 degrees and 88.5 degrees. Motor 32H rotates polygon mirrored spinner 20H.

Pattern mirrors 22H produce scanning light beams that emanate from substantially horizontal aperture 34H to form a horizontal scan pattern for reading bar code 42 on item 40. Pattern mirrors 22H also collect light reflected from item 40 and direct it to polygon mirrored spinner 20H.

Collection optic 24H routes collected light from polygon mirrored spinner 20H to routing mirror 26H.

Routing mirror 26H routes the collected light to detector assembly 28H.

Detector assembly 28H focuses, optically filters, and converts collected light into electrical signals.

Detection circuitry 30H obtains bar code information from the electrical signals. Detection circuitry 30H includes circuitry for digitizing bar code information.

Vertical optics assembly 12V projects a scan pattern from substantially vertical aperture 34V and primarily scans bar codes located on a customer side and top side of an item. Like horizontal optics assembly 12H, vertical optics assembly 12V scans the leading and trailing sides, as well as intermediate surfaces including those between the bottom and customer side surfaces. However, for simplicity the substantially similar vertical assembly will not be described in detail herein.

Control circuitry 36 processes the electrical signals from detector assemblies 28H and assembly 28V to obtain bar code information. Control circuitry 36 passes the bar code information to POS terminal 14.

Control circuitry 36 controls operation of lasers 16H and 16V and motors 32H and 32V. Control circuitry 36 may remove power from lasers 16H and 16V and motors 32H and 32V to increase their longevity.

POS terminal 14 receives transaction data, for example, in the form of SKU numbers from scanner 10 and completes a transaction by finding price data for the SKU numbers in a price-lookup data file.

Figure 2:
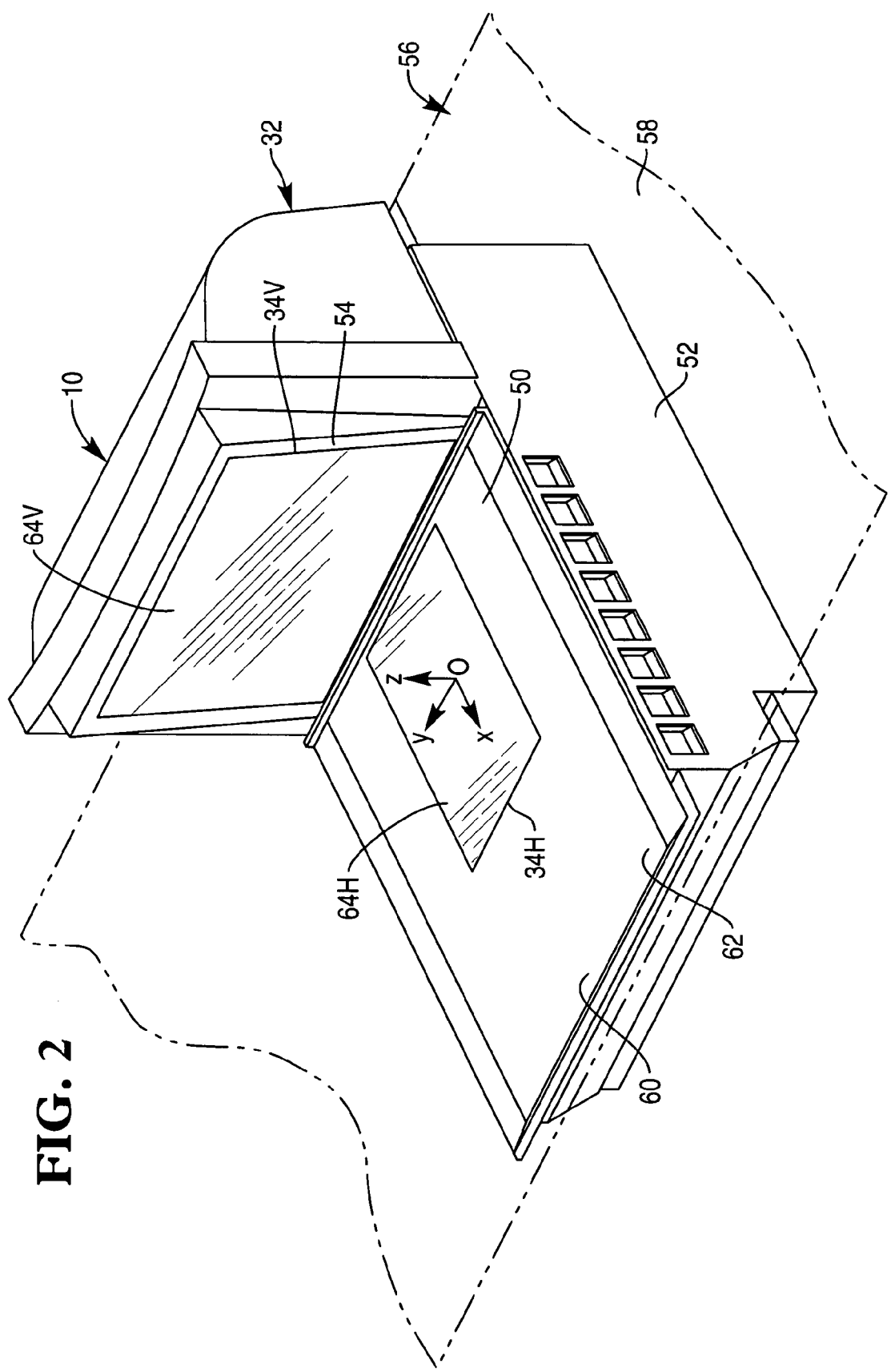
FIG. 2 is an exterior perspective view of the scanner of FIG. 1, including a reference coordinate system for the group of pattern mirrors within the scanner.

Turning now to FIG. 2, scanner 10 is shown in perspective.

Scanner 10 as illustrated includes an integral scale 60. Scale 60 includes weigh plate 62, which includes substantially horizontal surface 50 and substantially horizontal aperture 34H. Horizontal window 64H is located within horizontal aperture 34H.

Substantially vertical aperture 34V is located within substantially vertical surface 54. Substantially vertical window 64V is located within substantially vertical aperture 34V.

Scanner 10 includes housing 52. Preferably, housing 52 may be easily adapted to fit in a typical checkout counter 56. It is envisioned that substantially horizontal surface 50 be made substantially flush with top surface 58 of counter 56. Scanner 10 is installed within checkout counter 56 so that substantially vertical aperture 34V faces a store employee or other operator.

An illustrated reference X-Y-Z coordinate system determines orientations of pattern mirrors 22H and 22V within scanner 10 of the present invention. Origin O is defined such that:

X=0 is on the centerline of the scanner;
Z=0 is on the centerline of the scanner; and
Y=0 is on the substantially horizontal surface 50.

Figure 3:
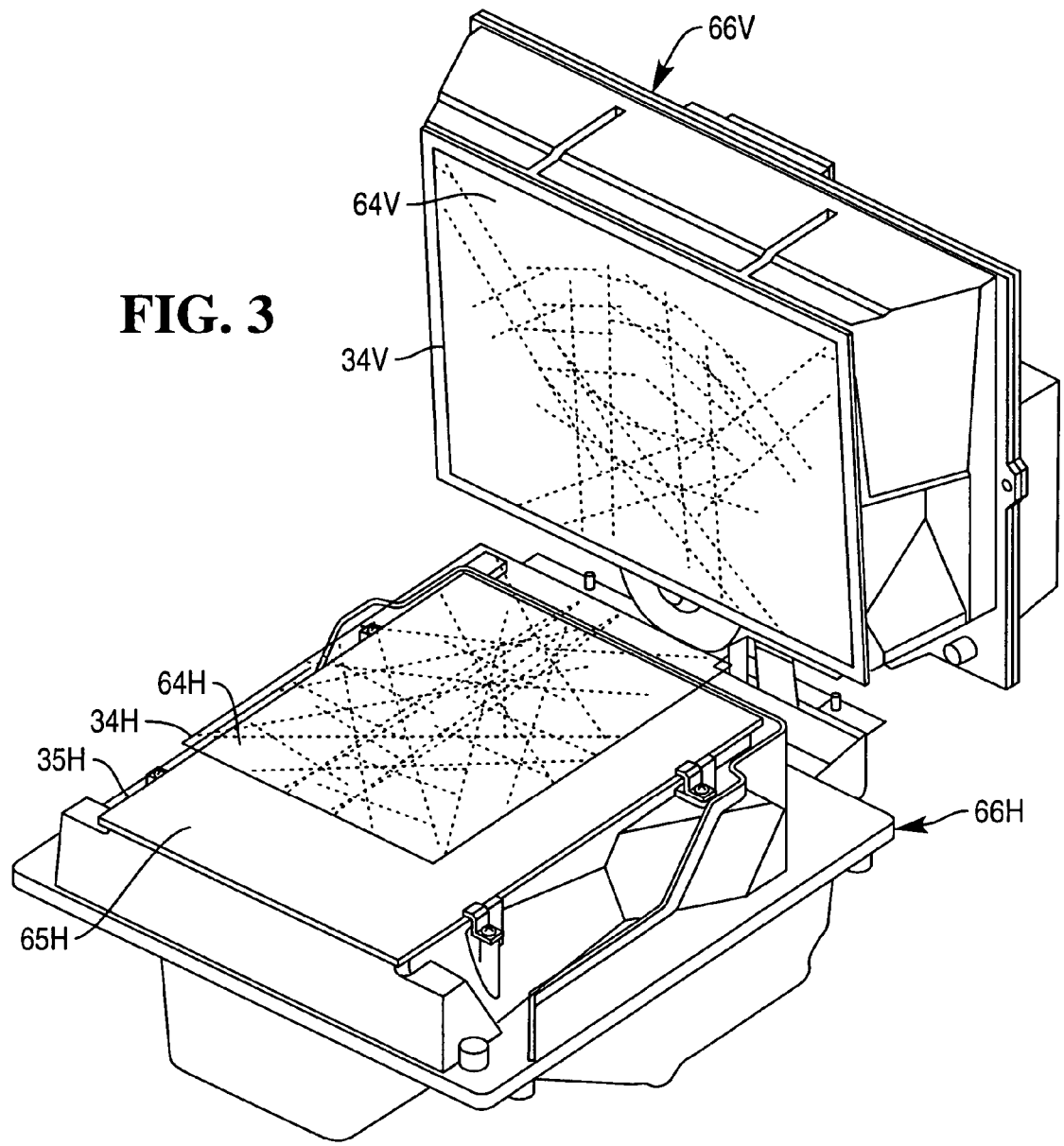
FIG. 3 is an interior perspective view of the scanner of FIG. 1, showing horizontal and vertical scanner portions.

Referring now to FIGS. 3–4, horizontal optics assembly 12H and vertical optics assembly 12V are shown in their positions within housing 52.

Horizontal optics assembly 12H and vertical optics assembly 12V each have nearly all of the optical components of a functional bar code scanner. Horizontal optics assembly 12H and vertical optics assembly 12V each have their own housings 66H and 66V and printed circuit boards 68H and 68V. In the illustrated example, control circuitry 36 is located in horizontal optics assembly 12H and signals vertical optics assembly 12V are brought to control circuitry 36 via cables 69.

Horizontal optics assembly 12H includes horizontal aperture 35H and window 65H. Scale weigh plate 62 with horizontal aperture 34H and window 64H are located above window 65H.

Horizontal optics assembly 12H will scan all label orientations on the bottom and checker sides of item 40, as well as certain orientations on the leading and trailing sides.

Optical pathing between laser 16H and polygon mirrored spinner 20H avoids contacting pattern mirrors 22H along the way. Laser 16H is located on a checker side of horizontal optics assembly 12H and polygon mirrored spinner 20H is located on the opposite side. Collection optic 24H is located adjacent laser 16H. The laser beam from laser 16H passes through hole 25H in collection optic 24H. Detector assembly 28H is located between collection optic 24H and polygon mirrored spinner 20H.

Spinners 20H and 20V are located where they are in order to generate suitable scan lines. In optics assembly 12H, the generation of the front vertical lines requires arcs of light reflected from a spinner 20H on the back side of the optical cavity.

Substantially vertical aperture 34V is oriented at an acute angle T of about 86 degrees from substantially horizontal aperture 34H. Other angular configurations, acute and obtuse, are also anticipated by the present invention.

Operationally, lasers 16H and 16V emit laser beams onto aiming mirrors 18H and 18V, which reflect the laser beams through holes 25H and 25V in collection optics 24H and 24V and then onto mirrored polygon spinners 20H and 20V. The polygon facets further reflect the laser beams up or down (for horizontal assembly 12H) or forward or rearward (for vertical assembly 12V), depending upon the facet struck. As the facets rotate, the laser beams are scanned in a shallow arc and reflected onto pattern mirrors 22H and 22V. In some cases, primary pattern mirrors reflect the laser beams through apertures 34H and 34V onto surfaces of item 40. In other cases, the primary pattern mirrors reflect the laser beams onto secondary mirrors that reflect the laser beams through apertures 34H and 34V onto surfaces of item 40.

As item 40 is moved through the scan zone (above horizontal aperture 34H and in front of vertical aperture 34V), scan lines generated by the laser beams from horizontal and vertical apertures 34H and 34V strike bar code label 42, no matter where it is located on item 42. A scan line will pass through all or part of bar code label 40.

Item 42 scatters light back along the path of the incident laser light. The scattered light passes through horizontal and vertical apertures 34H and 34V, onto the secondary mirrors (if present), onto the primary mirrors and onto the polygon facets. The rotating facets reflect the scattered light onto collection optics 24H and 24V. Collection optics 24H and 24V focus the scattered light onto detector assemblies 28H and 28V by way of routing mirrors 26H and 26V. Detector assemblies 28H and 28V convert the scattered light into electrical signals for analog processing by pre-video circuitries 30H and 30V and digital processing by control circuitry 36.

Figure 5:
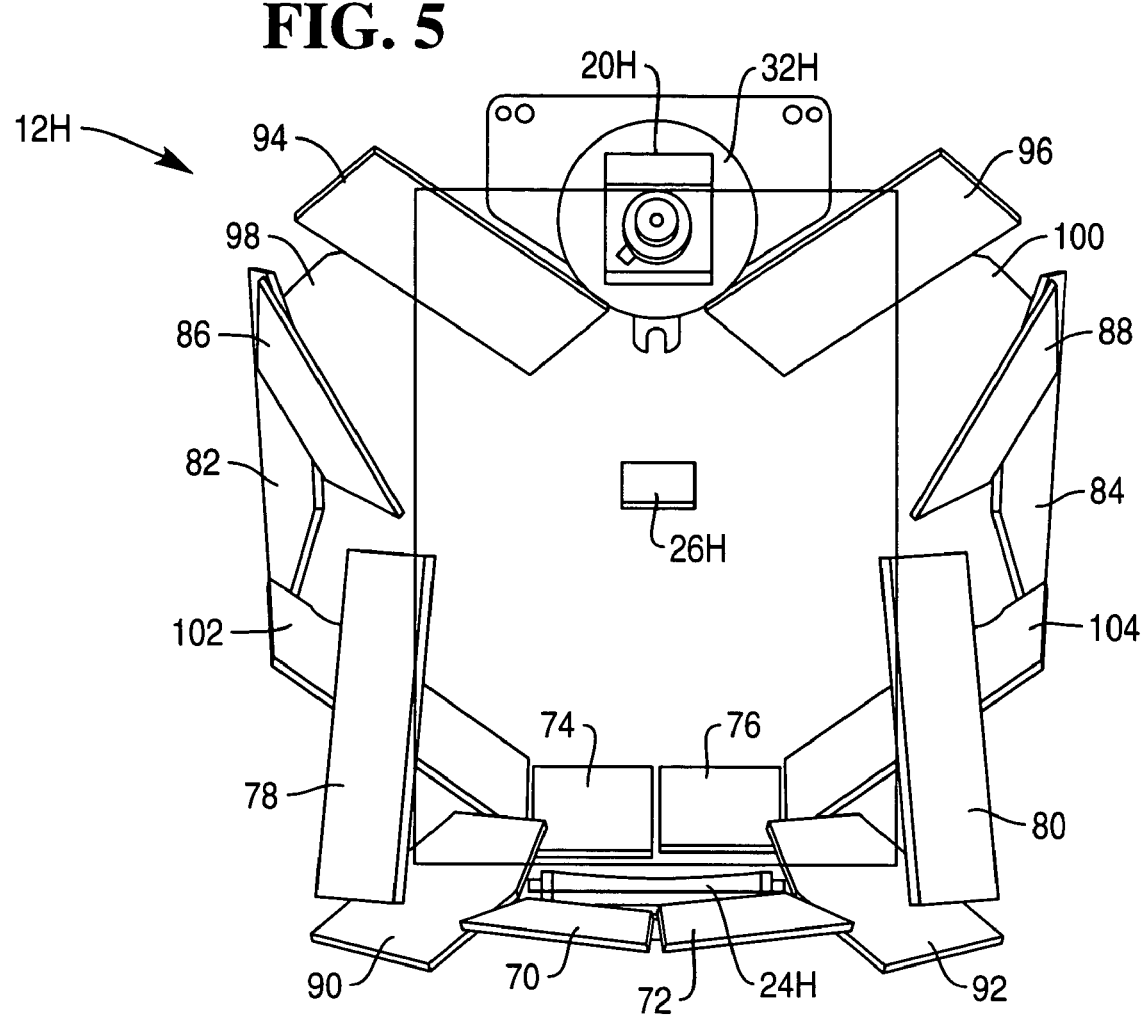
FIG. 5 is a top view of a horizontal mirror basket within a horizontal optics assembly.

Referring now to FIG. 5, pattern mirrors 22H are shown in detail. Horizontal pattern mirrors 22H include primary pattern mirrors and secondary pattern mirrors. The primary pattern mirrors receive a laser beam directly from spinner 20H. The secondary mirrors receive the laser beam from some of the primary pattern mirrors.

The term "front" as applied to mirrors means operator or checker side. The term "rear" as applied to mirrors means the side opposite to the operator or checker side. As illustrated, horizontal pattern mirrors 22H exhibit substantially bilateral symmetry between the leading and trailing sides of horizontal optics assembly 12H.

The primary pattern mirrors include left rear diagonal mirror 86, right rear diagonal mirror 88, left front vertical mirror 78, right front vertical mirror 80, left front vertical mirror 82, right horizontal mirror 84, left front picket mirror 70, right front picket mirror 72, left front diagonal mirror 102, right front diagonal mirror 104, left front bottom picket mirror 74, and right front bottom picket 76.

The secondary pattern mirrors include left rear diagonal mirror 94, right rear diagonal mirror 96, left front vertical mirror 90, right front vertical mirror 92, left horizontal mirror 98, and right horizontal mirror 100.

With reference to FIGS. 7 to 13, scanners 200 in accordance with the present invention utilize a two axis scan engine having a dynamic second scan axis 202, which increases the scan volume of the scanner 200 (FIG. 12).

In one embodiment this second axis 202 rotates substantially orthogonally to the spin axis 204 (FIG. 7) of the spinner 200 to essentially rotate the scan volume about this axis (FIGS. 7 to 10 and 12).

Two approaches are shown in FIGS. 8 and 9 to describe two different possible methods for rotating the spinner axis 204 while it is on a revolving axis 202.

In the embodiment of FIG. 8 a motor 206 rotates the gimbal 208 and the spinner 226 is mounted on the gimbal via a spinner shaft 212. The spinner shaft 212 is arranged to contact (either directly or indirectly) a surface of a stationary cylinder 214. Through friction between the cylinder 214 and the spinner shaft 212, or through an arrangement of gears or the like, the rotation of the gimbal 208 causes the rotation of the shaft 212 and consequently the rotation of the spinner 226. Due to the difference in the circumferences of the spinner shaft 212 and the cylinder 214 the spinner 226 is geared to rotate many timed faster than the gimbal 208.

In the embodiment of FIG. 9 a first motor 206 rotates the gimbal 208, as in FIG. 8; however a second motor 207 is arranged to rotate the spinner shaft 212 and thus the spinner 226. The first motor (~1,000 RPM) is a low speed high torque motor. The second motor 207 is a high speed (~20,000 RPM) low torque motor.

In more detail the optical scanner 200 comprises a scanner housing 218 including a scan window 220. The scanner 200 also contains a laser light source 222 and a detector 224 for detecting light reflected from a bar code. The scanner 200 further and most importantly includes a spinner 226 arranged to spin around both a first axis of rotation 204 and a second axis of rotation 202. In one embodiment the axes of rotation 202, 204 are substantially orthogonal and the first axis of rotation 204 is substantially parallel to the plane containing the scan window 220.

The polygon spinner 226 is externally mirrored as With standard spinners for bar code scanners. In addition the scanner housing 218 can contain pattern mirrors, as described above with reference to FIGS. 1 to 6, arranged to direct light from the polygon spinner 226 through the scan window 220 so as to produce scan lines.

As described above, with reference to FIG. 7, in one embodiment the spinner 226 is mounted on a rotating gimbal 208, which is in turn rotated, on the gimbal axis 202, by a motor 206. The spinner 226 may be rotated, on the spinner axis 204, by a number of different means, as would be apparent to a person skilled in the art, including, but not limited to, the application of magnetic force or compressed air.

FIG. 10 illustrates an embodiment of a scanner in accordance with the present invention in which pattern mirrors 228 arranged to direct overspill light from the polygon spinner 226 (which would not otherwise come directly off of the spinner and out of the scan window) through the scan window 220, so as to produce scan lines. In a first embodiment the pattern mirrors 228 are a pair of mirrors which spin with the gimbal and thus, in effect, rotate the overspill or excess of each scan line. In a second embodiment the pattern mirror 228 are arranged as an internally mirrored polygon substantially surrounding the spinner 226. The polygon 228 is fixed and performs the same function of directing light out of the scan window without spinning with the gimbal 208.

The scanner produces a substantially hemispherical scan volume as illustrated in FIGS. 10 and 12.

As can be seen in FIG. 10 the externally mirrored polygon spinner 226 is arranged to spin in said first axis of rotation (pointing out of the page) and is located substantially within the pattern mirrors 228, which are arranged to spin in said second axis or rotation 202 in the plane of the page.

FIG. 11 illustrates a preferred embodiment of the scanner in accordance with the present invention, in which the optical barcode scanner 240 is comprised of a scanner housing assembly 242, window assembly 244 and a dual axis scan engine 246. The scanner also includes a laser light source (not shown), collection optics (not shown), detector assembly (not shown) and decoding electronics (not shown). However, a person skilled in the art would b aware of the best location within the scanner housing assembly 242 for these components. The scan engine is comprised of a mirrored polygon spinner arranged to spin around both the spinner axis of rotation 204 and the gimbal axis of rotation 202, as described above.

The polygon spinner 226 is mounted in a gimbal assembly which in accordance with one embodiment may include a yoke, motor(s), bearings, axle, and spinner. The gimbal assembly is rotated by a motor about the gimbal axis. The polygon spinner is also rotated about its spinner axis by contact or non-contact means as described above.

In this the preferred embodiment of the dual axis scan engine, it can be seen that the polygon spinner reflects the laser light directly out the scanner window aperture 245. Therefore in this embodiment, pattern mirrors are not required.

In alternative embodiments of the dual axis scan engine, the spinner reflects a portion of the laser light directly out of the scanner window aperture 245, and the remaining portion of the laser light is reflected off of pattern mirrors prior to being directed out the scanner window aperture. The pattern mirrors may be stationary, or they may be mounted such that they rotate about the second axis 202, as described above with reference to FIG. 10.

Finally, the optical scanner 200 further comprises control circuitry 36 in the scanner housing 218 for obtaining bar code information from electrical signals from the reflected light detector 224, as with the scanners as described in FIGS. 1 to 6.

Scanners in accordance with embodiments of the present invention have a number of advantages. In particular the scan volume is many times that of a conventional single axis scanner (compare FIGS. 6 & 12), and the readable barcode orientations are increased as well. Also the scan pattern produced by the scanner is considerably more dense than that of prior art scanners, with a greatly increased number of scan lines, which are also more closely packed than with previous scanners, as can be seen in FIG. 13. Also, this approach does not necessarily need pattern mirrors (see FIG. 10), which can reduce scanner complexity and production costs significantly. Productivity of the scanner will be significantly increased.

The foregoing description of the preferred embodiments of the invention has been presented for the purposes of illustration and description. It is not intended to be exhaustive or to limit the invention to the precise form disclosed. Many modifications and variations are possible in light of the above teaching within the spirit and scope of the invention as claimed.

What is claimed:

1. An optical scanner comprising a scanner housing including a scan window, a laser light source, reflected light detector and a mirrored polygon spinner arranged to spin through multiple full rotations around both a first axis of rotation and a second axis of rotation simultaneously, the spinner having a plurality of facets, at least two of the facets being differently angled from one another with respect to an axis of rotation passing longitudinally through the spinner.

2. The optical scanner of claim 1, wherein the first and second axis of rotation are substantially orthogonal.

3. The optical scanner of claim 1, wherein the first axis of rotation is directed substantially towards the scan window.

4. The optical scanner of claim 1, wherein the polygon spinner is externally mirrored.

5. The optical scanner of claim 1, further comprising pattern mirrors arranged to direct light from the polygon spinner through the scan window so as to produce scan lines.

6. The optical scanner of claim 1, wherein the spinner is mounted on a rotating gimbal which is in turn rotated by a motor.

7. The optical scanner of claim 6, wherein the spinner is rotated by a motor through slip rings or a commutator.

8. The optical scanner of claim 6, wherein the spinner is mounted on a shaft which is rotated by friction or gears on a stationary cylinder surrounding the motor and spinner.

9. The optical scanner of claim 1, wherein the spinner is rotated through the application of magnetic force.

10. The optical scanner of claim 1, wherein the spinner is rotated through the application of compressed air.

11. The optical scanner of claim 1, further comprising control circuitry in the scanner housing for obtaining bar code information from electrical signals from the reflected light detector.

12. An optical scanner comprising a scanner housing including a scan window, a laser light source, reflected light detector and a mirrored polygon spinner arranged to spin through multiple full rotations around both a first axis of rotation and a second axis of rotation simultaneously, the spinner having a plurality of facets, at least two of the facets being differently angled from one another with respect to an axis of rotation passing longitudinally through the spinner, the scanner further comprising an arrangement of pattern mirrors arranged to direct light from the polygon spinner through the scan window so as to produce scan lines, wherein the externally mirrored polygon spinner is located substantially within said arrangement of pattern mirrors.

13. The optical scanner of claim 12, wherein the arrangement of pattern mirrors comprises an internally mirrored polygon or basket of mirrors.

14. The optical scanner of claim 12, wherein the spinner is mounted on a rotating gimbal which is in turn rotated by a motor.

15. The optical scanner of claim 14, wherein the spinner is rotated by the motor via a slip ring.

16. The optical scanner of claim 14, wherein the spinner is mounted on a shaft which is rotated by friction on a stationary cylinder surrounding the motor and spinner.

17. The optical scanner of claim 12, wherein the spinner is rotated through the application of magnetic force.

18. The optical scanner of claim 12, wherein the spinner is rotated through the application of compressed air.

19. A mirrored polygon spinner assembly, for use with an optical scanner, the assembly comprising a spinner and a means of rotating the spinner, the spinner being arranged to spin through multiple full rotations around both a first axis of rotation and a second axis of rotation simultaneously, the spinner having a plurality of facets, at least two of the facets being differently angled from one another with respect to an axis of rotation passing longitudinally through the spinner.

20. The spinner of claim 19, wherein the first and second axis of rotation are substantially orthogonal.

21. The spinner of claim 19, wherein the spinner is externally mirrored.

22. The spinner of claim 19, wherein the spinner is mounted on a rotating gimbal which is in turn rotated by the means for rotating the spinner.

23. The spinner of claim 22, wherein the means for rotating the spinner is a motor.

24. The spinner of claim 23, wherein the spinner is rotated by the motor via a slip ring.

25. The spinner of claim 22, wherein the spinner is mounted on a shaft which is rotated by friction on a stationary cylinder surrounding the motor and spinner.

26. The spinner of claim 19, wherein the spinner is rotated through the application of magnetic force.

27. The spinner of claim 19, wherein the spinner is rotated through the application of compressed air.

28. The spinner of claim 19, further comprising an internally mirrored polygon spinner arranged to direct light from the polygon spinner through the scan window so as to produce scan lines.

29. The spinner of claim 28, wherein the externally mirrored polygon spinner is arranged to spin in said first axis of rotation and is located substantially within said arrangement of pattern mirrors which is arranged to spin in said second axis or rotation.

30. A method of scanning a bar code utilizing an optical scanner comprising a scanner housing including a scan window, a laser light source, reflected light detector and a mirrored polygon spinner arranged to spin through multiple full rotations around both a first axis of rotation and a second axis of rotation simultaneously, the spinner having a plurality of facets, at least two of the facets being differently angled from one another with respect to an axis of rotation passing longitudinally through the spinner, so as to produce a scan volume outside of the scan window, the method comprising positioning the bar code within the scan volume at any orientation to the scan window.

31. The method of scanning of claim 30, wherein the scan volume produced is cone shaped.

32. The method of scanning of claim 30, wherein the scan volume produced is substantially hemispherical.

33. An optical barcode scanner comprised of a scanner housing assembly, window assembly, laser light source, collection optics, detector assembly, decoding electronics, and a dual axis scan engine, the dual axis scan engine comprising a mirrored polygonal spinner arranged to spin simultaneously through multiple full rotations around both a first axis of rotation and a second axis of rotation, the spinner having a plurality of facets, at least two of the facets being differently angled from one another with respect to an axis of rotation passing longitudinally through the spinner.

34. The scanner of claim 33, wherein the spinner reflects a portion of the laser light directly out of the scanner window aperture, and the remaining portion of the laser light is reflected off of pattern mirrors prior to being directed out the scanner window aperture.

35. The scanner of claim 33, wherein the pattern mirrors are stationary.

36. The scanner of claim 33, wherein the pattern mirrors are mounted such that the pattern mirrors rotate about the second axis.

37. A scan engine comprised of a mirrored polygon spinner arranged to spin through multiple full rotations around both a spinner axis of rotation and a gimbal axis of rotation simultaneously, the spinner having a plurality of facets, at least two of the facets being differently angled from one another with respect to an axis of rotation passing longitudinally through the spinner.

38. The scan engine of claim 37, wherein the spinner and gimbal axes of rotation are substantially orthogonal, with the gimbal axis pointed towards the collection optics and exit window, when in use.

39. The scan engine of claim 37, wherein the polygon spinner is mounted in a gimbal assembly which may include a yoke, one or more motors, bearings, axle, and spinner.

40. The scan engine of claim 39, wherein the gimbal assembly is rotated by a motor about the gimbal axis.

41. The scan engine of claim 39, wherein the polygon spinner is rotated about the spinner axis by a contact or non-contact rotational means.

42. The scan engine of claim 41, wherein the contact or non-contact means are chosen from an electric motor, friction, gears, electra-magnetic fields, permanent magnetic fields or gas or air pressure.

* * * * *